FIG. 1
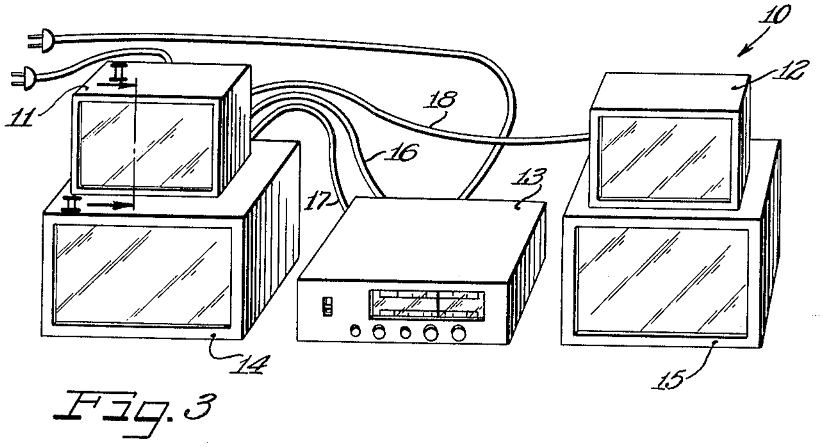
FIG. 3
FIG. 2
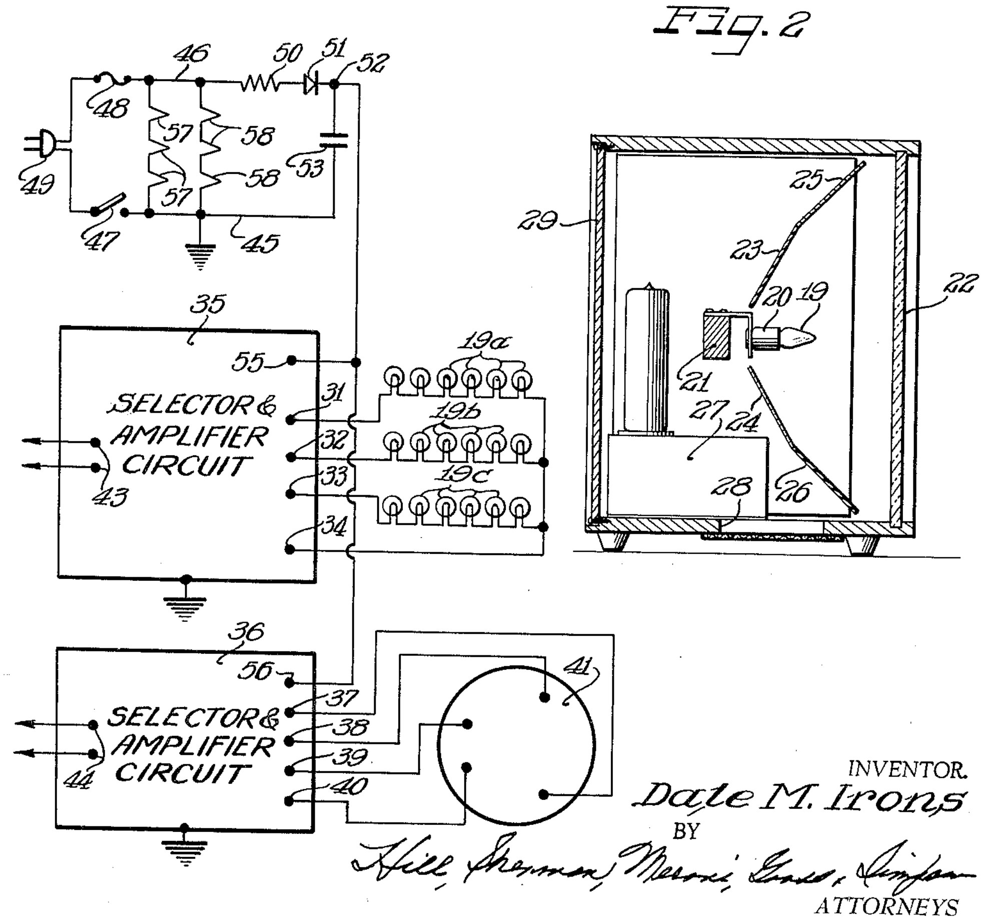
INVENTOR.
Dale M. Irons
BY
Hill, Sherman, Meroni, Gross & Simpson
ATTORNEYS INVENTOR.
Dale M. Irons
BY
Hill, Sherman, Meroni, Gross & Simpson
ATTORNEYS United States Patent Office 3,240,099

Patented Mar. 15, 1966

3,240,099

SOUND RESPONSIVE LIGHT SYSTEM

Dale M. Irons, 1210 W. Granville Ave., Chicago, Ill.

Filed Apr. 12, 1963, Ser. No. 272,590
7 Claims. (Cl. 84—464)

This application is a continuation-in-part of my copending application entitled "Sound Responsive Light System," Serial No. 50,541, filed August 18, 1960, now abandoned.

This invention relates to a system which was particularly designed for producing multi-colored lighting effects in response to audio signals, although it will be understood that certain features of the invention may be used in other applications. The system of this invention produces effects which are highly pleasing and harmonious and at the same time it is very efficient, rugged and reliable while being relatively simple and inexpensive in construction.

As disclosed in said copending application, a plurality of lamp units, each of which may contain one or more lamps, are respectively connected in the cathode circuits of a plurality of power amplifier tubes having control grids connected to the outputs of a plurality of rectifier circuits which are energized from a plurality of multi-stage amplifiers, with the inputs of the amplifiers being connected to the outputs of frequency selective circuits. Such frequency selective circuits are supplied with audio signals from a common multi-stage amplifier having an input connected through a mixing circuit to the outputs of a plurality of audio signal sources which may preferably drive suitable speakers to simultaneously produce sound.

With this system, the light units are respectively energized in accordance with signal components in various portions of the audio frequency spectrum and a harmonious and highly pleasing effect is obtained, especially when the lights are of various colors.

The present invention utilizes various features as disclosed in said copending application and additional features which provide improved performance, simplification, economy and reliability.

One very important feature used in the system of this invention, also disclosed in said copending application, is in the connection of the lamp units in the cathode circuits of the power amplifier tubes. With this feature, the dynamic range of operation is extended while protecting the lamps against excessive current. In particular, the improved operation results from the fact that the grid-cathode voltage of each amplifier tube is equal to the input voltage minus the product of the cathode current and the resistance of the lamp units and the fact that with incandescent lamps, the resistance increases as the lamp heats up. With input signal voltages below a certain level, the lamps will not heat up and the product of the current and the resistance is sufficient to maintain the grid at a relatively low potential relative to the cathode. However, when the input signal voltage is increased above a certain level, the tube current will be increased to a value such that the lamp will begin to heat up to increase the resistance thereof, thus increasing the product of the current and the resistance, and thus increasing to potential of the grid relative to the cathode only slightly. The net effect is that the lamps are energized at or near full brightness levels whenever the signal input voltage exceeds a certain threshold value.

The circuit also functions to prevent excessive current through the lamps and the tubes because the cathode potential rises as the grid potential rises to prevent the grid from becoming excessively positive relative to the cathode, except during high instantaneous peaks of the input signal, and to thereby prevent excessive current. If a lamp should burn out, the associated tube will cease to conduct current.

Another advantage is that one terminal of each lamp unit may be connected to chassis ground and no dangerous voltages are present at the lamp assembly. In addition, the circuit provides a low source impedance and a relatively long cable may be used.

Another important feature, also disclosed in said copending application, is in the provision of frequency selective circuits having resistors and shunt and series capacitors with values so related as to select particular portions of the audio frequency spectrum. Such circuits have comparatively broad pass bands which is highly desirable in producing the proper effects. At the same time, inductors are not required, which is important because inductors suitable for audio frequency use must be large in size and weight and quite expensive.

Additional features of the invention reside in the energization of the frequency selective circuits either directly or through a single amplifier stage from the secondary of a step-up transformer and in the direct connection of the outputs of the frequency selective circuits to the rectifier circuits. The primary of the transformer may be directly energized from the output of an audio amplifier and this arrangement eliminates a number of voltage amplification stages otherwise required and also simplifies the circuit while improving the reliability thereof.

A specific feature is in the direct connection of a frequency selective circuit and rectifier in a manner such that a capacitor of the frequency selective circuit serves as an element for building up a D.C. voltage from the rectifier for direct application to the control grid of the power amplifier stage, thereby performing a dual function.

Still another feature of the invention is in the provision of a pair of separate sections respectively connected to the outputs of a stereo system, to produce different lighting effects from the two sections.

This invention contemplates other objects, features and advantages which will become more fully apparent from the following detailed description taken in conjunction with the accompanying drawings which illustrate a preferred embodiment and in which:

FIGURE 1 is a perspective view showing a pair of display units constructed according to this invention and connected to the output of a stereo system;

FIGURE 2 is a cross-sectional view through one of the display units of FIGURE 1, taken substantially along line II—II thereof;

FIGURE 3 is a circuit diagram of the system;

Figures 4, 5, 6, 7:
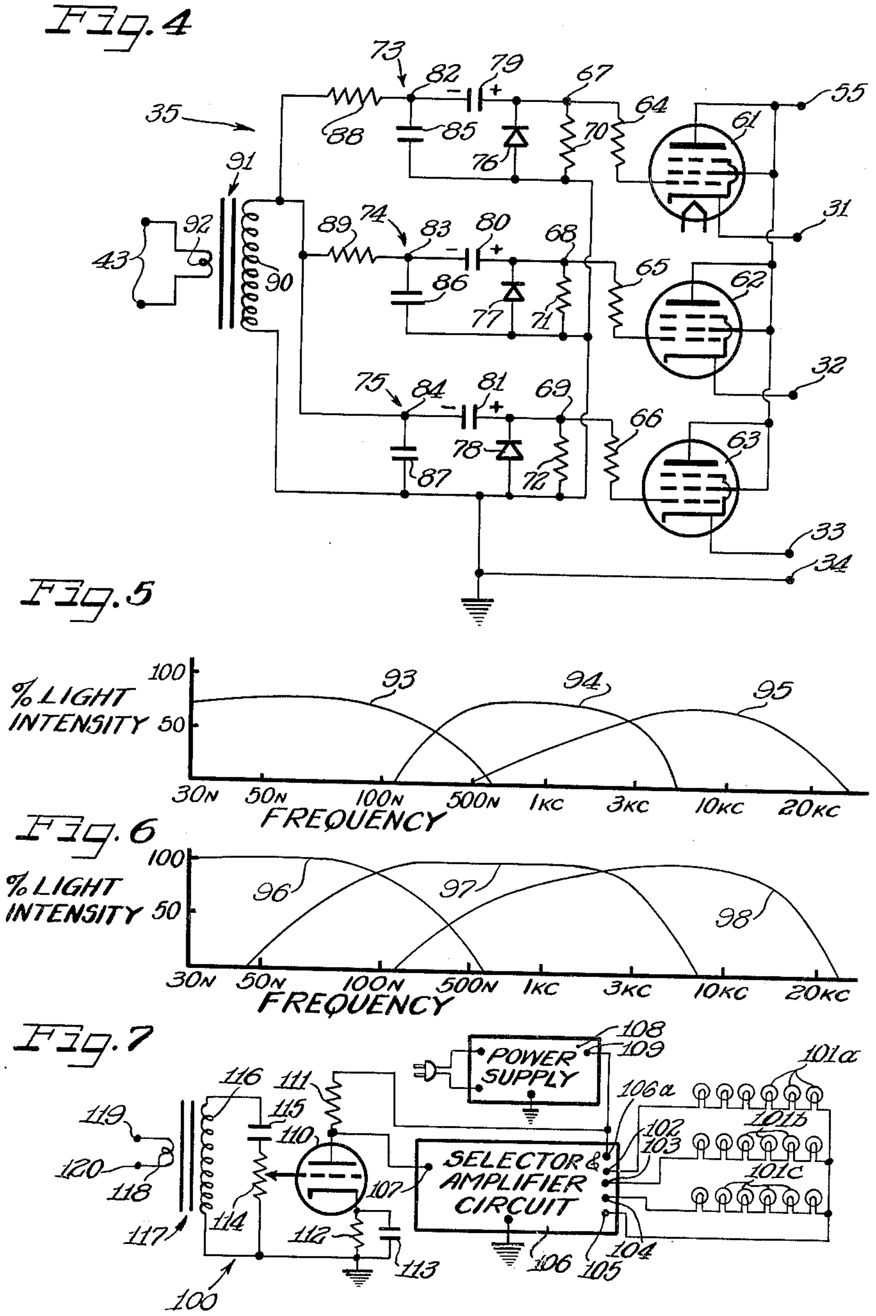
FIGURE 4 is a circuit diagram of a selector and amplifier circuit used in the circuit of FIGURE 3.
FIGURE 5 shows frequency response curves obtained with the selector and amplifier circuit of FIGURE 4 at moderate input signal levels.
FIGURE 6 shows frequency response curves obtained with the circuit of FIGURE 4 at high input signal levels.
FIGURE 7 shows a modified selector and amplifier circuit.

Referring to FIGURE 1, reference numeral 10 generally designates a display and sound system constructed according to this invention. The system 10 comprises first and second display units 11 and 12 which produce multi-color lighting effects from the outputs of a stereo receiver 13, also connected to a pair of speakers 14 and 15 to simultaneously reproduce sound. The unit 11 is referred to as a "master" unit and contains selector and amplifier circuits for both units, the inputs of the circuits being connected through cables 16 and 17 to the "right" and "left" outputs of the receiver 13, with the output of one selector and amplifier circuit being connected through a cable 18 to the lamps of the slave unit 12.

The physical construction of the display unit 11 is illustrated in FIGURE 2. As shown, a plurality of lamps 19 are mounted in sockets 20 on a horizontal support bar 21 behind a screen 22, with a first pair of mirrors 23 and 24 and a second pair of mirrors 25 and 26 being mounted at angles such as to project and spread the light from the lamps over substantially the entire area of the screen 22 with uniform intensity. The screen 22 may preferably be of glass and preferably has a diffusion pattern of grooves formed on one surface thereof to produce a pleasing effect.

The illustrated unit 11 has eighteen lamps, six red lamps **19*a*, six blue lamps 19*b* and six clear lamps 19*c* arranged so that a lamp of each color is disposed between lamps of the other two colors. Thus as viewed from the front of the unit, the left-hand lamp may be red, the second lamp blue, the third lamp clear, the fourth lamp red, etc. These lamps are energized in response to audio signals from particular portions of the audio spectrum, the red lamps 19*a* being energized in response to low frequency signals, the blue lamps 19*b* in response to intermediate frequency signals and the clear lamps 19*c*** in response to high frequency signals. With this arrangement, a highly pleasing and harmonious effect is obtained but it will be appreciated that of course other colors and other arrangements of the lamps may be used, as desired.

Selector and amplifier circuits for both units 11 and 12 are mounted on a chassis 27 within the master unit 11, and the construction of the slave unit 12 is substantially identical to that of the master unit 11, except for the omission of the selector and amplifier circuits. An opening 28 is provided in the bottom of the master unit 11 and additional openings are provided in a back 29 thereof, for ventilation.

Referring now to FIGURE 3, the red, blue and clear lamps **19*a*, 19*b* and 19*c* are respectively connected in series to form three lamp groups or units which are connected between output terminals 31, 32 and 33 and a common terminal 34 of a first selector and amplifier circuit 35. A second selector and amplifier circuit 36 has output terminals 37–40 connected to terminals of a socket 41 for connection through the cable 18 to lamp groups of the slave unit 12. The selector and amplifier circuits 35 and 36 have pairs of input terminals 43 and 44 connected through the cables 16 and 17 to the left and right outputs of the stereo receiver 13**.

To supply power to the circuits 35 and 36, a pair of conductors 45 and 46 are respectively connected through a switch 47 and a fuse 48 to a plug 49 for obtaining power from a conventional 110–120 volt A.C. outlet, the conductor 45 being grounded. Conductor 46 is connected through a current-limiting resistor 50 and a rectifier 51, preferably a silicon diode, to a circuit point 52 which is connected through a filter capacitor 53 to ground and is also connected to power terminals 55 and 56 of the selector and amplifier circuits 35 and 36. A D.C. voltage on the order of from 120 to 135 volts is thereby applied to the terminals 55 and 56. As diagrammatically indicated, the heaters 57 of three tubes of the selector and amplifier circuit 35 and the heaters 58 of three tubes of the selector and amplifier circuit 36 are connected in series between the conductors 45 and 46.

FIGURE 4 shows the connection of the selector and amplifier circuit 35, the selector and amplifier circuit 36 being identical. As shown, the output terminals 31, 32 and 33 are respectively connected to the cathodes of three power amplifier tubes 61, 62 and 63 having plates and screen grids connected together and to the power terminal 55, and having control grids serving as one input for each tube connected through resistors 64, 65 and 66 to circuit points 67, 68 and 69 which are connected through resistors 70, 71 and 72 to ground, the common input-output terminal 34 being also connected to ground.

Positive input signal voltages are developed at the circuit points 67, 68 and 69 by frequency selective and rectifier circuits 73, 74 and 75, circuit 73 being responsive to signal components in a low frequency range, circuit 74 being responsive to signal components in an intermediate frequency range and circuit 75 being responsive to signal components in a high frequency range. In particular, circuit points 67, 68 and 69 are respectively connected through diodes 76, 77 and 78 to ground and through capacitors 79, 80 and 81 to circuit points 82, 83 and 84 connected to ground through shunt capacitors 85, 86 and 87. Circuit points 82, 83 and 84 are connected through resistors 88 and 89 and through a direct connection to one terminal of a secondary winding 90 of a step-up transformer 91 having a primary winding 92 connected to the input terminals 43, the other terminal of the secondary winding 89 being connected to ground.

In operation, a relatively high signal voltage is developed across the secondary winding 90 in response to a relatively low input signal voltage applied to the primary winding 92. During negative half-cycles of the signal voltage, the rectifiers 76–78 are in series circuit with capacitors 79–81 and conduct to charge the capacitors 79–81 with a polarity as indicated on the drawing to establish positive potentials at the circuit points 67–69. The magnitudes of the positive voltages thus developed are dependent upon the magnitude of the input signal voltage and upon the values of the respective capacitors. In the case of the circuit 73, designed for operation at the low frequency end of the audio range, the series capacitor 79 has a relatively high value of series reactance to permit the buildup of a charge in response to low frequency signals, while the shunt capacitor 85 also has a relatively high value to provide a low impedance or low shunt reactance to higher frequency signals. The capacitor 80 has a somewhat smaller value than the capacitor 79 to prevent the buildup of a charge at lower frequencies while the capacitor 86 has a somewhat lower value than the capacitor 85 to provide a low shunt impedance at a frequency substantially higher than that at which the capacitor 85 is effective. The capacitors 81 and 87 similarly have still smaller values to operate at a higher range of frequencies.

It will be readily appreciated that the build-up of a charge on the capacitors 79–81 will establish a D.C. pedestal for the signal voltage on the secondary winding 90. In effect, this D.C. pedestal will allow the lamps in the cathode circuit to follow the signal voltage throughout both its positive and negative cycles with a relatively small amount of each negative cycle employed for replenishing any resultant discharge from the capacitors 79–81. This action is a result of the high time constant in the discharge path of capacitors 79–81.

By way of illustrative example and not by way of limitation, the resistors and capacitors may have the following values:

| Reference numeral: | | Value |
|---|---|---|
| **50** | ohms | 5 |
| **64–66** | do | 100,000 |
| **70–72** | megohms | 1.5 |
| **79** | microfarads | 0.033 |
| **80** | do | 0.001 |
| **81** | micromicrofarads | 100 |
| **85** | microfarads | 0.015 |
| **86** | micromicrofarads | 470 |
| **87** | do | 82 |
| **88**, **89** | ohms | 220,000 |

The tubes 61 and 63 may be type 35EH5 while the tube 62 may be type 50EH5. The diode 51 preferably has a rating of 750 milliamperes with a peak inverse voltage rating of 400. The transformer 91 may preferably have a turns ratio such as to provide a secondary impedance of 85,000 ohms with a primary impedance of 8 ohms.

The lamps 19*a*, 19*b* and 19*c* are preferably 4 volt, 60 milliampere lamps.

FIGURE 5 illustrates frequency response curves obtained with values as listed above, with a moderate level sine wave input signal constant at 0.5 volt R.M.S. Curve 93 shows the output of the red lamps 19*a* in terms of percentage of maximum light intensity, while curves 94 and 95 similarly show the outputs of the blue and clear lamps 19*b* and 19*c*.

FIGURE 6 is a similar graph wherein curves 96, 97 and 98 show the light outputs of the lamps 19*a*, 19*b* and 19*c* with a high level sine wave input signal constant at 1.5 volts R.M.S. It will be noted that although the signal input voltage is increased by three times from FIGURE 5 to FIGURE 6, the output does not exceed 100% of the maximum light intensity and is only 33% greater. This is due to a large extent from the operation of the lamps in the cathode circuits of the power amplifier tubes. It may also be noted that the frequency response curves are quite broad and overlap to some extent particularly with higher level input signals. It is found that this is desirable in producing a highly pleasing effect in response to a wide range of types of audio input signals. It is possible, however, to narrow the response curves to obtain particular types of effects, which can be accomplished by appropriate selection of the values of the capacitors in the frequency selective circuits.

FIGURE 7 illustrates a modified circuit 100 wherein series-connected groups of lamps 101*a*, 101*b* and 101*c* are connected between output terminals 102, 103 and 104 and a common input-output terminal 105 of a selector and amplifier circuit 106. Circuit 106 is substantially identical to the circuit illustrated in FIGURE 4, but having an input terminal 107 corresponding to the point of the circuit of FIGURE 4 which is connected to resistors 88 and 89 and the circuit point 84. A D.C. power supply 108 substantially identical to that shown in FIGURE 3 has a power terminal 109 connected to a power terminal 106*a* of the circuit 106.

Terminal 107, instead of being connected directly to the secondary winding of a transformer, is connected to the plate of a triode 110 and through a plate load resistor 111 to the power terminal 109 of the D.C. power supply 108. The cathode of the triode 110 is connected to ground through the parallel combination of a bias resistor 112 and by-pass capacitor 113 while the grid thereof is connected to the adjustable contact of a potentiometer 114 which is connected through a coupling capacitor 115 to the secondary winding 116 of a step-up transformer 117 a primary winding 118 connected to input terminals 119 and 120.

The operation of this circuit is substantially the same as that of the circuit illustrated in FIGURES 3 and 4, except that an increased amplitude of signal may be applied to the lamps in response to low amplitude input signals, and except that the amplitudes are adjustable by adjustment of the potentiometer 114. This circuit is desirable in circumstances in which it is desired to obtain full outputs from the lamps while operating at low audible sound levels. The circuit illustrated in FIGURE 7 is a monaural system, but it will be apparent that it could be extended to a stereo or two-channel system as illustrated in FIGURES 3 and 4, by inserting an amplifier stage as illustrated in FIGURE 7 between the secondary windings of the input transformers and the input terminals of the associated frequency selective circuits.

It will be understood that modifications and variations may be effected without departing from the spirit and scope of the novel concepts of this invention.

I claim as my invention:

1. In a system for producing varying lighting effects,
a plurality of lamp means,
a plurality of amplifier devices each having an output terminal, a power terminal, and an input terminal,
a supply voltage source, a ground reference point, means exclusively connecting a respective one of said lamp means to said output terminal of a respective one of said amplifier devices and connecting the respective one of said lamp means between said output terminal of a respective one of said amplifier devices and said reference point, the resistance of said lamp means being increased in response to heating thereof,
means connecting said power terminal of said amplifier devices to said supply voltage source terminal,
and means for applying variable signals, between said input terminal of said amplifier devices and said reference point,
an increase in the resistance of said lamp means effecting a decrease in the signals applied between said input terminal and said output terminal.

2. In a system for producing varying lighting effects,
a plurality of lamp means,
a plurality of amplifier tubes each having an anode, a cathode and a control grid,
a supply voltage source, a ground reference point,
means exclusively connecting a respective one of said lamp means to a respective one of said cathodes and connecting the prespective one of said lamp means between respective ones of said cathodes and said reference point,
means connecting said anodes to said supply voltage source,
and means for applying variable signals between said control grids and said reference point,
an increase in current through said lamp means causing an increase in potential on said cathodes to decrease the effective signals applied between said control grids and said cathodes.

3. In a system for producing varying lighting effects,
a plurality of lamp means each including a plurality of lamps having filaments connected in series,
a plurality of power amplifier means each having an output connected to a respective one of said lamp means and each having an input terminal, a ground reference point,
a plurality of diode rectifiers,
a plurality of capacitors each connected to a respective one of said diode rectifiers to form respective series circuits,
means for applying variable A.C. signals to said series circuits to charge respective ones of said capacitors through respective ones of said rectifiers during half-cycles of one polarity and to establish across said rectifiers voltages having D.C. components,
and means connecting each of said rectifiers to respective ones of said input terminals of said power amplifier means to control energization of said lamps in accordance with said A.C. signals superimposed on respective ones of said D.C. components while automatically applying a D.C. bias voltage to respective ones of said outputs of said power amplifier means responsive to current flow through said series-connecte filaments,
said D.C. bias voltage varying directly with and caused by the varying accumulative resistance of the series-connected filaments due to heating action thereof as said filaments begin to conduct current.

4. In a system for producing varying lighting effects,
a plurality of lamp means,
a plurality of power amplifiers each having an output connected to respective ones of said lamp means and each having an input terminal,
a plurality of frequency selective circuits each comprising a series capacitor presenting a high series reactance at low frequencies and a shunt capacitor presenting a low shunt reactance at high frequencies,
said capacitors having values relative to one another such as to cause said circuits to pass different portions of the audio frequency spectrum,
means for applying an audio frequency signal to said frequency selective circuits,
and means coupling said frequency selective circuits to said input terminals of said power amplifiers, said frequency selective circuits each including means for charging said series capacitors during negative cycles of the audio frequency signal to allow the audio frequency signal to be applied to said input terminals on a D.C. pedestal formed by the charge on said capacitors.

5. In a system for producing varying lighting effects,
a plurality of lamp means each including a plurality of lamps having filaments connected in series,
a plurality of power amplifier means connected to a respective one of said lamp means and each having an input terminal,
a plurality of diode rectifiers,
a plurality of frequency selective circuits each comprising a first capacitor in series with a respective one of said rectifiers and operative to present a high series reactance at low frequencies and a second capacitor in shunt relation to the series combination of said first capacitor and rectifier to present a low shunt reactance at high frequencies,
said capacitors having values relative to one another such as to cause said frequency selective circuits to pass different portions of the audio frequency spectrum,
means for applying an audio frequency signal to said frequency selective circuits to charge said first capacitors through said recifiers during half-cycles of one polarity and to establish across said rectifiers voltages having D.C. components,
and means connecting each of said rectifiers to a respective one of said input terminals of said power amplifier means to control energization of said lamp means in accordance with said audio frequency signal superimposed on respective ones of said D.C. components,
the controlled energization of said lamp means being regulated automatically by a varying bias voltage created by a change in resistance of said series-connected filaments due to heating action thereof as said lamps begin to draw current.

6. In a system for producing varying lighting effects,
a plurality of lamp means,
a plurality of power amplifier means each having a respective output connected to a respective one of said lamp means and each having an input terminal,
a plurality of diode rectifiers,
a plurality of capacitors each connected to a respective one of said diode rectifiers to form series circuits.
means for applying variable A.C. signals to said series circuits to charge said capacitors through respective ones of said rectifiers during half-cycles of one polarity and to establish across said rectifiers voltages having D.C. components,
and means connecting said rectifiers to a respective one of said input terminals of said power amplifier means to control energization of said lamps in accordance with said variable A.C. signals superimposed on respective ones of said D.C. components.

7. In a system for producing varying lighting effects,
a plurality of lamp means,
a plurality of power amplifier means each connected to a respective one of said lamp means and each having an input terminal,
a plurality of diode rectifiers,
a plurality of frequency selective circuits each comprising a first capacitor in series with a respective one of said rectifiers and operative to present a high series reactance at low frequencies and a second capacitor in shunt relation to the series combination of said first capacitor and rectifier to present a low shunt reactance at high frequencies,
said capacitors having values such as to cause said frequency selective circuits to pass different portions of the audio frequency spectrum,
means for applying an audio frequency signal to said frequency selective circuits to charge said first capacitors through said rectifiers during half-cycles of one polarity and to establish across said rectifiers voltages having D.C. components, and
means connecting each of said rectifiers to a respective one of said input terminals of said power amplifier means to control energization of said lamp means in accordance with said audio frequency signal superimposed on respective ones of said D.C. components.

References Cited by the Examiner

UNITED STATES PATENTS

| | | | |
|---|---|---|---|
| 1,654,068 | 12/1927 | Blattner | 84—464 |
| 1,977,997 | 10/1934 | Patterson | 84—464 |
| 2,131,934 | 10/1938 | Burchfield | 84—464 |
| 2,275,283 | 3/1942 | Burchfield | 84—464 |
| 2,712,574 | 7/1955 | Brink | 179—171 |
| 2,839,732 | 6/1958 | Hochman | 33—70 X |
| 2,848,609 | 8/1958 | Ruthroff | 333—70 |
| 2,907,838 | 10/1959 | Ross | 179—171 |
| 3,038,061 | 6/1962 | O'Reilly | 84—464 X |
| 3,111,057 | 11/1963 | Cramer | 84—464 |

LEO SMILOW, *Primary Examiner.*

S. J. TOMSKY, *Assistant Examiner.*